United States Patent
Nanis et al.

(10) Patent No.: US 10,351,482 B1
(45) Date of Patent: Jul. 16, 2019

(54) MINE WASTE SOURCE FOR BIO-MINERAL FERTILIZER TO REMINERALIZE AGRICULTURAL SOIL

(71) Applicant: Advanced Materials processing, Inc., Morgan Hill, CA (US)

(72) Inventors: Leonard Nanis, San Jose, CA (US); Dennis Amoroso, Gilroy, CA (US); James Shumard, San Jose, CA (US); Garrett Chavez, San Jose, CA (US); Thomas Sharples, Pleasanton, CA (US); Ryan Sigler, Clayton, CA (US)

(73) Assignee: Advanced Materials Processing, Inc., Morgan Hill, CA (US)

(*) Notice: Subject to any disclaimer, the term of this patent is extended or adjusted under 35 U.S.C. 154(b) by 166 days.

(21) Appl. No.: 15/582,964

(22) Filed: May 1, 2017

Related U.S. Application Data

(60) Provisional application No. 62/350,564, filed on Jun. 15, 2016.

(51) Int. Cl.
| | | |
|---|---|---|
| C05F 11/00 | (2006.01) | |
| C05D 9/02 | (2006.01) | |
| C05G 3/04 | (2006.01) | |
| C09K 17/04 | (2006.01) | |
| C05F 11/08 | (2006.01) | |
| C05F 17/00 | (2006.01) | |
| C05D 1/04 | (2006.01) | |

(52) U.S. Cl.
CPC .............. C05D 9/02 (2013.01); C05D 1/04 (2013.01)

(58) Field of Classification Search
None
See application file for complete search history.

(56) References Cited

U.S. PATENT DOCUMENTS

| | | | | |
|---|---|---|---|---|
| 1,029,378 A | * | 6/1912 | Lawton | C05F 17/00 36/76 R |
| 1,260,103 A | * | 3/1918 | Wallace | C05F 11/08 261/105 |

(Continued)

FOREIGN PATENT DOCUMENTS

| | | | | |
|---|---|---|---|---|
| EP | 1180499 | * | 8/2000 | C02F 3/32 |

OTHER PUBLICATIONS

Cheek, "Front-page story: Morgan Hill company turning mine waste into plant nutrients," Morgan Hill Life, Jan. 20-Feb. 2, 1016 issue, 6 pages.

(Continued)

*Primary Examiner* — Wayne A Langel
(74) *Attorney, Agent, or Firm* — Haynes Beffel & Wolfeld LLP

(57) ABSTRACT

Natural biomineral fertilizers for sustainable farming are produced in an environmentally sound manner from mine waste. Finely divided mine waste and process tailings serve as a novel source of rock powder for use as fertilizer. Mine waste and process tailings may be treated with non-toxic chemicals to selectively remove certain unwanted elements such as mercury. Solid and liquid fertilizers are also obtained by digesting mine waste and process tailings in combination with bio-waste plus selected bacteria under anaerobic conditions. Anaerobic digestion also generates methane gas for use as fuel for generating electricity or for process heating.

18 Claims, 1 Drawing Sheet

(56) References Cited

U.S. PATENT DOCUMENTS

| | | | | |
|---|---|---|---|---|
| 3,135,595 | A * | 6/1964 | Williams | C05D 9/02 23/301 |
| 3,836,442 | A * | 9/1974 | Dean | C01D 3/16 205/512 |
| 3,892,553 | A * | 7/1975 | Goordman | C02F 11/12 71/13 |
| 4,012,297 | A * | 3/1977 | Balko | C01D 3/16 205/529 |
| 5,605,557 | A | 2/1997 | Hall | |
| 6,254,654 | B1 | 7/2001 | Van Barneveld | |
| 6,409,788 | B1 * | 6/2002 | Sower | C05F 3/00 71/11 |
| 6,490,826 | B2 | 12/2002 | Acey | |
| 8,308,839 | B2 | 11/2012 | Prasad | |
| 8,425,647 | B1 | 4/2013 | Brooke | |
| 2005/0257586 | A1 * | 11/2005 | Dunn | A01N 59/00 71/15 |
| 2011/0182786 | A1 * | 7/2011 | Burba, III | C22B 3/02 423/20 |
| 2011/0185780 | A1 | 8/2011 | Prasad | |
| 2015/0203414 | A1 * | 7/2015 | Cook | C05D 9/00 71/7 |
| 2016/0311728 | A1 * | 10/2016 | Swensen | C05D 9/02 |

OTHER PUBLICATIONS

Geotherapy, Ed. by T.J. Goreau, R.W. Larson and J. Campe, published by CRC Press, Boca Raton FL, Dec. 18, 2014, 618 pages.
Mata-Alvarez et al., Anaerobic digestion of organic solid wastes. An overview of research achievements and perspectives, Technology, vol. 74, Issue 1, Aug. 2000, pp. 3-16.

* cited by examiner

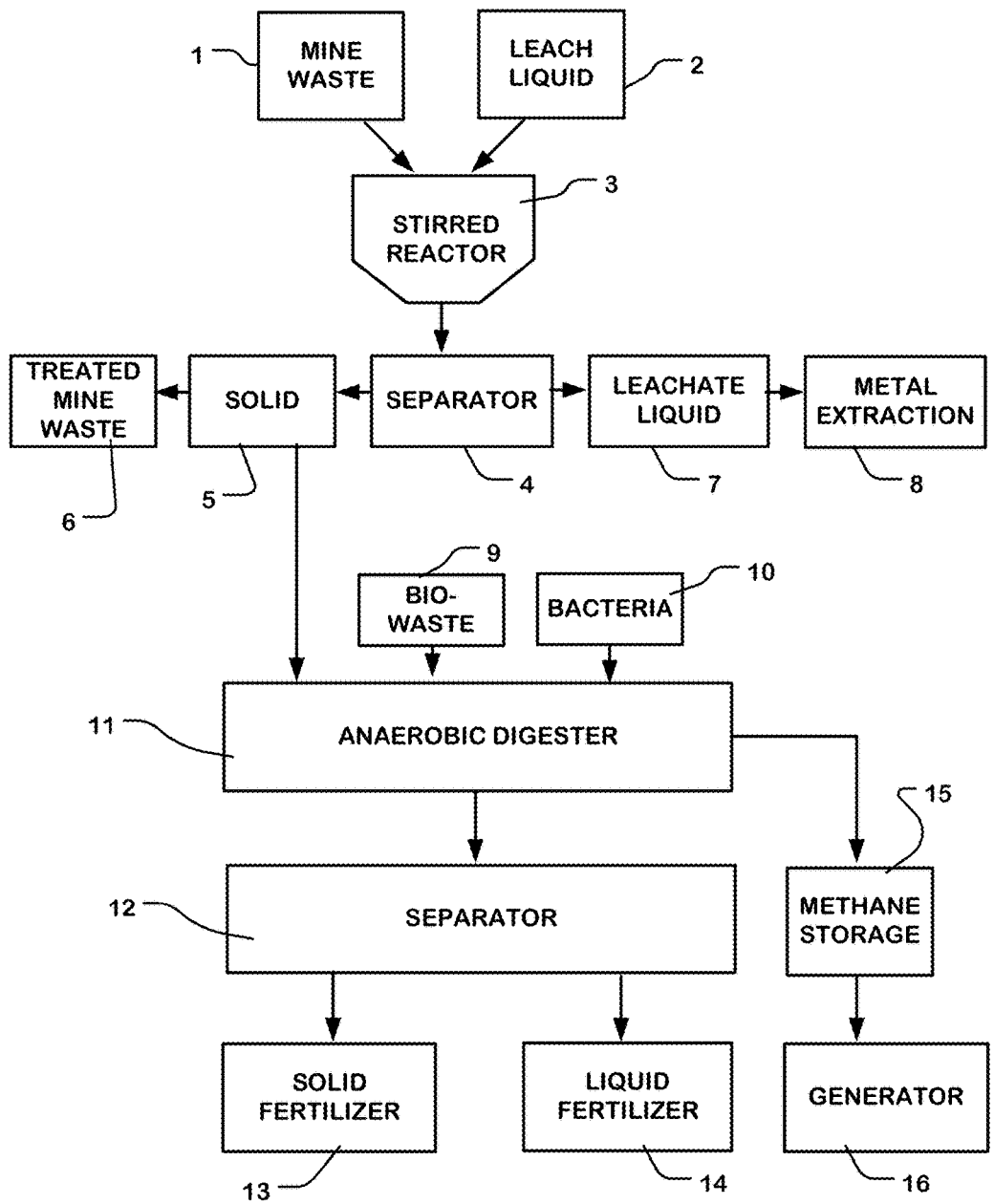

MINE WASTE SOURCE FOR BIO-MINERAL FERTILIZER TO REMINERALIZE AGRICULTURAL SOIL

PRIORITY APPLICATION

This application claims the benefit of U.S. Provisional Patent Application No. 62/350,564 filed 15 Jun. 2016; which application is incorporated herein by reference.

BACKGROUND

Technological Field

The present invention relates to the use of mine waste and also bio-waste combined with mine waste to produce fertilizer highly suitable for sustainable agriculture. The fertilizer can remineralize and restore plant nutrients to farm soil depleted over time by the use of conventional chemical fertilizers.

Description of Related Art

Ever increasing amounts of food are needed to feed the growing population of the Earth, yet crop yields on existing farmlands are decreasing. A key reason for this dilemma is that the nutrients in the soil have been depleted and are not replaced by conventionally used synthetic chemical fertilizers. What is needed is remineralization of the soil which can benefit crop growth by providing the essential natural chemistry needed for the complex interactions that occur in the root region of growing plants. For example, in the root region, there are fungi that produce organic acids which extract mineral nutrients from particles of rock and deliver these to the growing plant. The soil in the root region also contains enzymes, bacteria and organisms which act in concert to assist the growth of the plant. Bacteria are plentiful in the root zone but become dormant when the nutrients provided by the rock are exhausted. Thus, the addition of rock powder to the soil is a well-recognized path to restoring the growing power of agricultural soil. In contrast, synthetic fertilizers function once and do not contribute to the continued viability of the soil. The small particle size and associated high surface area of rock powder (also known as stonemeal or stonedust) is valuable because it makes the nutrient elements readily available to the nutrient vectors in the root region.

Rock powder is presently in short supply, although clearly recognized by advocates as a solution to the problem of providing plant growth nutrient elements to farm soil. Limited supplies of rock powder have been taken from crushed rock stone quarries and in regions where glacial action has crushed stone. Advocates for remineralizing agricultural soil have proposed a few new sources. In the recent comprehensive book titled "Geotherapy" edited by T. J. Goreau, R. W. Larson and J. Campe, published by CRC Press, Boca Raton Fla. 33487-2742, (2015) ISBN 13: 978-1-4665-9539-2, the suggestions include volcanic ash and recycled glass.

Although rock powder is recognized as a valuable soil supplement, as mentioned, its use has been retarded because of a limited supply. One Australian commercial quarried product, Min Plus, has a yearly output of merely 5000 tons per year.

As world requirements for increased food supply have mounted, sustainable farming has received attention as a path to achieve higher crop yields and also to restore the productivity of depleted farm soil. Growers have realized that conventional chemical fertilization has only a temporary effect. Within the last few decades, positive results have been obtained using rock powder as a source to restore nutrient elements to the soil without the problems associated with chemical fertilization, such as damage to wildlife habitat by runoff of chemicals washed out by irrigation and rain. Despite proven advantages of rock powder as agricultural fertilizer, its use has lagged because of a perceived shortage of raw material. Conventionally recommended sources are limited mainly to fine dust from gravel quarrying and also rocks crushed by glacier activity.

Mine waste has, until now, been overlooked as a source of rock powder. Hills of mine waste have been viewed as permanent fixtures of the surroundings. In fact, one method to deal with barren heaps of mine waste has been to change them to green hills by seeding to promote the growth of grass on the top surface. For certain types of mine waste containing a residue of sulfide ore, acid rain is known to convert the sulfide to sulfuric acid and dissolved metals, with toxic runoff that enters the local groundwater table. A proposed remedy is to cover the mine waste heap with polymer sheet as a cap to shield the heap from rain and to divert the rainfall to a catch pond. As a matter of speculation, mine waste may have also garnered a poor reputation in general as a result of highly publicized cases of toxic runoff and also massive contamination from spills of tailings stored in ponds. However, our research shows that mine waste that is in abundance in California, Nevada and Oregon has the same major composition as rock powder. Mine waste also contains minor or trace elements known to be beneficial for plant growth. In addition, mine waste is ready for use without the expenditure of energy for crushing and grinding to small particle sizes.

SUMMARY

A soil conditioning composition, and a method of making the same, is described which uses mine waste as a source of rock powder to make a composition used to remineralize agricultural soil. The mine waste is chemically treated to remove undesirable elements which might be harmful to plant growth. The treated mine waste may be directly applied to the soil or may be combined with bio-waste. The term "mine waste" is used herein to mean tailings or residue from ore and metal extraction processes, overburden removed to reveal ore bodies, and also unprocessed ore deposits.

The mine waste can be first treated to remove undesirable elements, if required, to greatly increase the availability of rock powder for agricultural fertilizer. The method is environmentally sound since embodiments are described in which no toxic chemicals are involved. Further, piles of mine waste at abandoned or dormant mines are to be steadily reduced in size as the mine waste is converted to a feed stock for the production of fertilizer. Also, little or no energy is required to crush the mine waste to an appropriate particle size since mine waste and process tailings were produced by ore crushing that was an original feature of mining and metal extraction technology.

A process is described in which the mine waste is first chemically treated with a water solution of non-toxic chemicals to extract elements which either have intrinsic commercial value or which may be harmful to plant growth. The chemical treatment is preferably accomplished at ambient temperature to minimize process energy input requirements. Reaction chemistry is selected to permit recycling of process water. Chemical treatment of mine waste can be tailored to extract valuable elements, including metals such as gold and silver or to extract potentially harmful elements such as mercury. Said extracted metals are recovered in separate process steps.

Bio-waste for mixture with treated mine waste is supplied from several sources, including, but not limited to, food waste, produce waste, discarded plant harvest matter (leaves and stalks), animal manure, etc. A mixture of treated mine waste, bio-waste and selected bacteria is processed in an anaerobic bio-converter yielding a combination of the treated mine waste with organic material, in a solid and a liquid soil additive plus by-product methane gas which fuels a turbine to generate electricity. Since bio-waste is thus diverted from landfill disposal, methane gas naturally produced by decomposition of organic matter is not added to the atmosphere as a greenhouse gas contributor to global warming.

The use of treated mine waste as a rock powder source for remineralization of agricultural soil, will add abundantly available material to advance the goals of sustainable agriculture.

Other aspects and advantages of the technology described herein can be seen on review of the drawings, the detailed description and the claims, which follow.

BRIEF DESCRIPTION OF THE DRAWINGS

FIG. 1 depicts a schematic arrangement of the process elements useable in a process to manufacture a soil enhancement composition.

DETAILED DESCRIPTION

A detailed description of embodiments of the technology is provided with reference to the FIG. 1.

The technology described herein has been based on knowledge combined from the fields of agriculture, botany, plant physiology, plant chemistry, food technology, geology, mineralogy, mineral engineering, bacteriology and other closely related disciplines. We find that the chemical analysis of raw ore and mine waste from abandoned or dormant mines in California, Nevada, Oregon and elsewhere closely matches the composition of rock powder presently available commercially. In addition, we have also developed non-toxic processes to extract from mine waste certain elements that are unwanted in fertilizer. Our research findings form the basis for the claims of this application, namely that treated mine waste is an eminently suitable and abundant source for rock powder, already available in particle sizes known to promote good plant growth.

The treated mine waste serves as a new supply of rock powder to be used directly to remineralize farm soil. Combination of said mine waste with bio-waste produces another useful type of fertilizer rich in elements such as carbon and phosphorous needed to promote healthy plant growth. Said bio-waste may be comprised of produce waste, food waste, harvest waste, animal manure etc., and combinations thereof. By digesting said bio-waste with said mine waste in an anaerobic reactor, by-product gas rich in methane is produced and stored, to be used as fuel for a turbine and the like to generate electricity and also for process heating.

In summary, an integrated environmentally sound system for soil remineralization is described which can result in major accomplishments of:

1) providing a new source of rock powder—a proven means to remineralize depleted agricultural soil,
2) removal of heaps of mine waste,
3) treatment to extract and capture valuable or unwanted elements from said mine waste,
4) use of only non-toxic chemicals to clean said mine waste,
5) minimal use of water for said mine waste cleaning treatment,
6) useful recycle of bio-waste to fertilize the growth of new crops,
7) avoids methane gas generation in landfill disposal of bio-waste,
8) generation of electricity from burning said methane gas,
9) production of nutrient-rich fertilizer to remineralize depleted agricultural soil, and
10) a means for cleanup of the water table by minimizing run-off of water-soluble pollutant chemicals associated with conventional chemical fertilizers.

Mine waste is a novel source of rock powder, treated chemically where necessary, ready for use as agricultural fertilizer. Mine waste has generally been overlooked as a source of rock powder. Our invention will provide abundant supplies of rock powder in an environmentally sound manner.

Rock powder is incorporated in soil improver compositions claimed by Van Barneveld in U.S. Pat. No. 6,254,654, issued 3 Jul. 2001, herewith cited as a reference. Van Barneveld (col. 7, lines 13-16) recommends igneous rock sourced from rock quarries, preferably serpentine basaltic rock. Van Barneveld teaches that the quarried rock is to be reduced to powder size by mechanical crushing methods such as ball or rod milling (col. 7 lines 10-12). In contrast, for processes described herein, rock powder is sourced from plentiful supplies of mine waste remaining as the tailings in the vicinity of mines after valuable metals have been extracted. As mentioned, the mine waste is already crushed and reduced in size. It is estimated that as much as a billion tons of mine waste are available in California alone plus three billion tons in Nevada. No energy input is needed to achieve a suitable particle size in contrast to the requirement of U.S. Pat. No. 6,254,654. Van Barneveld teaches a particle size of "less than 175 micron" in Claim 2, although the Detailed Description of the '654 patent (col. 6, line 67) teaches a "more preferable" particle size in the range 1 to 20 micron and a "most preferable" particle size around 4 micron. We experimentally find that mine waste is generally already available crushed to a size suitable for use as rock powder. As a typical example, scanning electron microscopy (SEM) of mine waste from Virginia City NV shows particle sizes ranging from 1 to 15 micron, with a mean value of 7 micron.

D. A. Hall in U.S. Pat. No. 5,605,557 (herewith included as reference) teaches a soil conditioning composition comprising 60 to 80 percent by weight of granite-like stone or rock plus 20 to 40 percent basalt and from 1 to 20 percent colloidal granite. Hall teaches that the granite in rock and colloidal form are both obtained from a single source, namely Australian quarried and crushed and milled granite (col 1, line 46 and line 65). Hall also teaches that granitic sources be free of heavy metal trace contaminants like mercury, cadmium and lead (col 1, line 38). Processes described herein differ from the limiting requirements of sources as taught by Hall in that we include means to specifically remove mercury from mine waste. Thus, processes described herein permit the use of mine waste still contaminated by residues of mercury that were involved in the extraction of gold and silver, as typified by the millions of tons of mine waste available in the Comstock Lode region in the vicinity of Virginia City, NV. In addition, the rock powder and combination of rock powder and bio-waste produced according to the processes described herein do not require the addition of supplementary materials, as taught by Hall. In U.S. Pat. No. 5,605,557 (col 1, line 32), Hall teaches that granite in both crushed rock and colloidal form be supplemented by the addition of other materials, such as calcium nitrate, urea, phosphoric acid, molasses and at least one non-ionic surfactant.

In US Patent Application 2011/0185780 (herewith included as reference), D. Y. Prasad teaches the use of kimberlite, a matrix rock in which diamonds are found, as a source of elements suitable for fertilizer. Prasad (claim 1) teaches that kimberlite be combined in substantial proportions with an alkali metal silicate such as sodium silicate. It is noted that kimberlite is known as an igneous rock species naturally deficient in silica, $SiO_2$. In comparison, mine waste typically includes abundant silicon content, present as silica or silicon dioxide. As shown in Example 1, Table 1, mine waste requires no special silicon additive, as taught by Prasad. Also, Prasad ([0023] and claim 3) teaches pulverization of the kimberlite to a very fine size by "micronization", a grinding method. In [0067], Prasad states that a natural initial particle size of kimberlite ranges from 100 microns to 3 millimeters. Application 2011/0185780 generally teaches that "nano-sized kimberlite" is desirable as a component of plant fertilizer. In [0066], Prasad teaches a size range for "nano-size kimberlite" from 75 nanometers (nm) to 250 nm, which is the same as from 0.075 micron to 0.25 micron. "Nano-size" is thus much smaller than the preferable 1 to 20 micron size range for rock powder as taught by Van Barneveld '654. It is known to those skilled in the art that "micronization" grinding of kimberlite to obtain "nano-size" is a multi-stage, energy intensive process, in contrast to the readily available particle sizes in typical mine waste, which requires no additional grinding or energy expenditure.

In U.S. Pat. No. 6,490,826 (col 2, lines 34-39 and Claim 1), Acey teaches a form of rock powder comprised of metal oxides equivalent to the composition of rock powder sourced from a glacial deposit with, however, the added limitation that said rock powder contain no more than 20 weight percent silicon. (U.S. Pat. No. 6,490,826 is herewith included as a reference.) However, said limitation excludes compositions typically found in rock powder that may be sourced from mine waste. The '826 Claim 1 limitation of no more than 20 weight percent silicon also excludes conventional rock powder sourced from rock quarries and glacial deposits. For example, chemical analyses listed in Example 1, Table 1 show that silicon is present at about 32 to 34 weight percent in mine waste sampled from various sources in Nevada and Oregon and is at about 22 to 23 weight percent in commercially available rock powder. In addition, '826 teaches the use of aerobic bacteria (col 7, line 12) to compare the performance of different rock powders. In contrast, processes described herein use oxygen-deprived anaerobic conditions for mixing bio-waste with treated mine waste to permit the useful generation of by-product methane gas. Further, '826 claim 3 and claims 8, 9 and 10 teach addition of fungi spores, bacteria and a biodegradable carbon source to the mineral composition of claim 1. In contrast, it is recognized herein that farm soil already has a plentiful supply of fungi and bacteria. Thus, direct use of treated mine waste as agricultural fertilizer, and also preparation of a mixture of treated mine waste and bio-waste, i.e. bio-degradable carbon source by pre-digestion in an anaerobic reactor, are taught herein. Although selected bacteria are added in the process described herein to said anaerobic digestion reactor to promote digestion of cellulosic bio-waste material, the process does not require the addition of fungi spores or other types of bacteria to the rock powder and bio-waste mixture as in the '826 Claims 3, 8,9 and 10. Similarly, in contrast to Hall '557 (col 1 line 32) the processes described herein do not specify that rock powder derived from mine waste or mixtures of rock powder and bio-waste require the addition of urea and other substances to aid the natural reactions that occur in the root zone of plants.

Pre-digestion in anaerobic conditions produces organic acids such as acetic acid which initiate the extraction of nutrient elements from mine waste particles. Thus, both the solid and liquid products of said digestion reactor provide a head start for plant growth by supplying nutrients to the root region of plants in soil fertilized by our method. It is noted that depleted soil previously used for agriculture will still contain microbes, fungi and other organisms that comprise the unseen complex root region of plants. The interactions of these root region components aid the growth of plants and receive a boost in activity when rock powder or a mixture of digested bio-waste and rock powder is added to the soil of the root zone.

FIG. 1 depicts a schematic arrangement of the process elements useable in a process to manufacture a soil enhancement composition. Mine waste (1) and leach liquid (2) are stirred together in a reactor vessel (3). After a period of reaction, the slurried mixture is discharged from the reactor vessel into a separator device (4) which sends leachate liquid (7) containing certain metals dissolved from the mine waste to an extraction device (8) wherein certain by-product metals are removed from the leachate solution. For example, the extraction method may be a flow-through column loaded with deionizing polymer resin beads that specifically attract certain dissolved metal ions. After passage through the resin column in the metal extraction device (8), the leachate, stripped of certain metals, is recycled to the leach liquid supply (2) for reuse in the reactor (3). Process controls (not shown) determine when the leach efficiency of the liquid is diminished to a degree requiring replacement by fresh leach liquid. Alternatively, metal extraction (8) may be accomplished by electrolytic deposition or selective chemical or biochemical precipitation of metal compounds (not shown).

The solid component (5) produced by separator (4) from slurry discharged from reactor (3) becomes a treated mine waste (6), ready for agricultural use as a rock powder product. Solid (5) also supplies mineral nutrient rich, finely-divided rock powder for mixture with bio-waste (9) and added bacteria (10) in anaerobic digester (11). Methane gas produced from reactions in the digester mixture is captured and stored (15) for use as fuel for burning in a turbine to generate electricity (16) and for heating purposes.

Liquid and solid phases produced by reactions in the anaerobic digester (11) are mechanically separated (12) to yield a mainly solid fertilizer (13) and a liquid fertilizer (14), both suitable for agricultural use.

FIG. 1 schematically identifies individual types of equipment used and the valuable products and by-products so generated. Those familiar with the art will recognize that, in practice, multiple pieces of each type of equipment may be arrayed, depending on times required for reaction and the throughput capacity of each type of equipment.

The process can begin with leaching of finely divided mine waste particles. The process of leaching generally refers to the extraction of metal from an ore by reaction with chemicals dissolved in a solution, usually a water solution.

The technology of extraction of metal from ore by reaction with chemicals dissolved in water is generally termed "hydrometallurgy." Referring to numbered process steps in FIG. 1, leaching is accomplished by thorough mixing of a slurry formed by (1) mine waste particles and (2) a leach liquid comprising a water solution of chemicals selected to react with metals or compounds that comprise the rock particles. Mine waste is first sieved to remove stones and debris. Mine waste or tailings are generally finely divided, having been crushed and milled during original mining and metal extraction processes before being sent to waste heaps. The fine rock particles in tailings typically have sizes ranging from 1 to 20 micrometers (0.04 to 0.8 thousandths of an inch).

For leaching, the water-mine waste slurry is contained in a reactor vessel (3) and is stirred continuously to promote good contact between the mine waste particles and the chemicals dissolved in the water. No toxic chemicals are used to prepare the leach liquid. The leaching chemicals used are preferably non-toxic, an innovative departure from the toxic cyanide leach solutions used conventionally in, for example, the gold mining industry. Stirring is accomplished by an immersed motor-driven paddle or vane supplemented by sparging with air introduced into the slurry through immersed perforated pipes. Air sparging also provides dissolved oxygen if needed for participation in leaching reactions. Leaching reaction times are preferably a few hours or less.

After the leaching reaction is complete, the slurry is discharged from the reactor (3) by pumping it into a separator (4) such as a de-sander, a device which separates the leached solids (5) from the liquid (7). The liquid is also known as "leachate." Depending on the chemistry of the leach liquid, the leachate will contain elements extracted from the mine waste particles in the slurry mixture. The dissolved elements can be extracted from the leachate (8) by several different methods, including but not limited to:

1) capture in deionizing polymer resin beads,
2) chemical precipitation of insoluble compounds,
3) electrolysis,
4) precipitation by bacterial action.

Flexibility in selecting non-toxic leach liquid compositions and in selecting methods for extraction of dissolved elements or molecular species from the leachate permits a tailored extraction sequence to be developed for ore compositions from different mine sites. Leach solutions may be selected to remove elements from mine waste which are undesirable for introduction into the root region of growing plants. For example, mercury may be selectively leached from mine waste before said treated solid is used directly as rock powder or is further processed. As an example of further processing, the chemically conditioned finely divided solid residue (5) from the leach step is fed into an anaerobic bio-converter (11) together with bio-waste (9) plus selected bacteria (10). A typical mixture fed into a bio-converter comprises 37 percent by volume of solid residue (5), 50 volume percent of waste vegetable matter (9), comminuted to a particle size smaller than 5 mm, and 13 volume percent of recycled spent leachate (2). Said bacteria (10) include *bacillus cereus* and *lactobacillus plantarum* to assist organic reactions in the bio-converter to break down cellulosic material in the vegetable waste (9) into organic material including simple molecules which serve as nutrients in the root region of crop plants and trees. In addition, the anaerobic, oxygen-deprived reactions in the bio-converter favor the generation of a gas rich in methane which is sent to storage (15). The methane serves as a gaseous fuel for a turbine to generate (16) electricity and also useful process heating.

The product of anaerobic digester (11) is fed to a separation device (12) which facilitates the production of a mostly solid fertilizer (13) for addition to growing soil and also a mostly liquid fertilizer (14) which may be applied by spraying methods.

As noted above, the solid leach residue (5) serves as a novel source of rock powder, a proven means to directly supply major and trace plant nutrient elements to remineralize the soil. As shown in Example 1, Tables 1 and 2, the composition of mine waste (tailings) and raw ore from various locations is a close match to the known composition of commercially available rock powder. The elements listed in Tables 1 and 2 are generally identified as plant nutrient elements as indicated, for example, by Brooke in U.S. Pat. No. 8,425,647, col 1, lines 35-45, herewith cited as a reference. In Table 1, concentration is reported as weight percent whereas in Table 2, for clarity, concentration is stated as milligrams per kilogram which is also parts per million (ppm).

EXAMPLES

Example 1

Plant Nutrient Content of Mine Waste

In Example 1, it is shown that the chemical composition of mine waste is the same as that of commercial rock powder. The data in Table 1 compares the main elements determined in samples of mine waste (tailings) and raw ore from various sources with a similar analysis of Min Plus, a commercially available rock powder product. The weight percentages reported in Table 1 are based on energy dispersive X-ray (EDX) element analysis of particles of mine waste and ore particles examined at high magnification in a scanning electron microscope (SEM) and also element determination by inductively coupled plasma spectroscopy of liquid from acid-digested ore particles. The composition of Min Plus rock powder listed in Table 1 is taken from chemical analysis reports published by Pacific Mineral Developments of Australia, producer of Min Plus soil conditioner and remineralizer.

In general, there is a close match between the composition of mine waste and ore sources and the commercially available rock powder Min Plus, particularly for the essential elements potassium (K), magnesium (Mg) and iron (Fe). Sample NV1 sourced from Virginia City NV has a detectable amount of mercury (Hg), the removal of which is addressed in our invention. Considering the variation possible from sample to sample of granular material from the same source and also the variation possible between individual grains examined at high magnification with SEM-EDX, the match of elements shown in Table 1 and Table 2 may be considered as strong support for the use of mine waste, process tailings and raw ore as a novel source of rock powder for agricultural applications.

TABLE 1

Table 1 is a Comparison of Weight Percent of Elements in Mine Waste and Rock Powder.

| SOURCE ELEMENT | NV1 | NS1 | OY2 | ROCK POWDER |
|---|---|---|---|---|
| Aluminum | 5.2 | 11.8 | 11.5 | 7.5 |
| Silicon | 33.7 | 33.8 | 19.2 | 22.0 |

TABLE 1-continued

Table 1 is a Comparison of Weight Percent of
Elements in Mine Waste and Rock Powder.

| SOURCE ELEMENT | NV1 | NS1 | OY2 | ROCK POWDER |
|---|---|---|---|---|
| Oxygen | 57.3 | 37.5 | 62.4 | 44.4 |
| Sodium | 0.2 | 1.5 | 0.02 | 2.1 |
| Potassium | 1.0 | 2.1 | 2.3 | 1.4 |
| Calcium | 0.1 | 0.3 | 2.0 | 6.9 |
| Magnesium | 0.5 | 5.8 | 1.5 | 6.5 |
| Iron | 2.3 | 6.2 | 0.4 | 7.8 |
| Titanium | 0.1 | 0.4 | — | 1.5 |
| Sulfur | 0.1 | 0.04 | — | 0.01 |
| Mercury | 0.1 | — | — | — |

Legend for Table 1
NV1: Virginia City, Nevada, Site 1 tailings; Data from SEM, Energy Dispersive X-ray Spectroscopy (EDX) and Inductively Coupled Plasma Spectroscopy
NS1: Fallon, Nevada, Site 1, raw ore; Data from SEM-EDX and Emission Spectroscopy
OY2: Bend, Oregon, Owyhee mine, mordenite layer; Data from SEM-EDX
ROCK POWDER: Analysis data from Min Plus corporate literature, Pacific Mineral Developments, Australia The trace elements listed in Table 2 are known to beneficially assist the complex interactions which occur in the root zone of plants and trees. Said elements are clearly present in abundant amounts in mine waste and ore.

TABLE 2

Table 2 is a Comparison of Trace Element
Concentration in Mine Waste with Rock Powder

| SOURCE ELEMENT | NV1 | NS1 | OY1 | ROCK POWDER |
|---|---|---|---|---|
| Manganese | 423 | 765 | 160 | 0.49 |
| Zinc | 188 | 93 | 1.6 | 0.28 |
| Boron | — | 0.56 | 1.0 | <0.05 |
| Copper | 172 | 128 | 122 | 0.15 |
| Molybdenum | 61 | 5.6 | 89.7 | — |

Legend for Table 2
NV1: Virginia City, Nevada, site 1 mine tailings, Spectrometric analysis. Reed Laboratories, Carlsbad, CA
NS1: Fallon, Nevada, site 1, raw ore, Reed Lab.
OY1: Bend Oregon, Owyhee Mine, mordenite layer, Reed Lab.
ROCK POWDER: Analysis data from Min Plus corporate literature, Pacific Mineral Developments, Australia Example 2

As shown in Example 1, Table 1, column NV1, mine waste from Virginia City NV contains a detectable amount of mercury. Accordingly, processes described herein address the removal of mercury from tailings found in the area of Virginia City, NV and similar ore locations in order to qualify the mine waste for use as rock powder in agricultural applications. Mercury is undesirable as a component of fertilizer and is known to form toxic water soluble methylmercury compounds.

In the history of the Virginia City, NV area, from 1850 onward, mining was principally for silver and gold. However, process waste accumulated for over 100 years of mining contains a residue of mercury which was a key ingredient in pan amalgamation, the gold and silver recovery process used in Virginia City. In each pan vessel, 1500 pounds of ore particles were ground together with 70 pounds of mercury plus other chemicals to form a silver-mercury amalgam. (As determined in our research, about ⅔ of a pound of mercury still remains in 1500 pounds of Virginia City mine waste.) In the early mining era of Virginia City, silver was recovered from the mercury-silver amalgam by heating the amalgam to drive off the volatile mercury. Virginia City mine waste from pan amalgamation still contains, in addition to mercury, small amounts of silver and gold.

The efficiency of the mercury extraction chemistry described herein was determined on a bench scale test of Virginia City mine waste. The average particle size was 7 micrometers, determined by scanning electron microscope (SEM). A test load of 0.2 kilogram of ore was mixed with a leachant comprised of 45 grams of sodium thiosulfate and 1 gram of copper sulfate pentahydrate, both dissolved in 1.8 Liters of water. The mine waste-leachant slurry mixture was stirred in a two liter reaction vessel for 30 minutes at 18° C. Samples of leachate liquid were obtained by filtration of 60 mL of slurry withdrawn from the reaction vessel. The leachate was analyzed for mercury by inductively coupled plasma (ICP) spectroscopy. The initial mercury concentration in the mine waste was determined by aqua regia digestion of the solid mine waste particles followed by ICP analysis of the resulting liquid. The efficiency of leaching was determined by comparing the grams of metal in the leachate with the initial weight of metal in the ore sample. The efficiency of mercury recovery was 64 percent.

Example 3

To verify the mercury leaching described in Example 2, similar Virginia City mine waste (process tailings) was leached as a stirred slurry comprised of 210 grams of powdered tailings, 45 grams sodium thiosulfate, 2 grams copper sulfate pentahydrate and 1.8 liters if water. The slurry was stirred for one hour at a temperature of 25.6° C. Initial mercury content of the tailings was determined by inductively coupled plasma (ICP) spectroscopy of liquid obtained by aqua regia digestion of a tailings sample. The concentration of mercury remaining in the residue of the leached slurry was determined by ICP analysis of liquid from aqua regia digestion of a residue sample, well-rinsed with deionized water and dried. Comparison of mercury remaining in the residue of the leached tailings with the initial mercury content of said tailings showed a mercury extraction efficiency of 85.8 percent.

Example 4

As a pilot plant scale example of chemical treatment to clean mine waste, the efficiency of mercury extraction was determined in a stirred tank reactor holding a slurry comprised of 57 kilograms of Virginia City mine waste and 151 liters of water stirred for 10 minutes to promote good wetting. The mine waste particles had an average size of 7 micron. The leach reaction was started by adding to the stirred slurry 3.8 kilograms of sodium thiosulfate plus 0.28 kilogram of copper sulfate pentahydrate. Stirring continued for one hour with the slurry at a temperature of 28° C. (82° F.). A sample of the slurry was filtered to obtain a liquid for mercury analysis by inductively coupled plasma (ICP) spectroscopy. The solid filter residue was digested in aqua regia and the resulting liquid was also analyzed for mercury by ICP. Efficiency of mercury extraction from the mine waste was determined as described in Examples 2 and 3 by comparing the calculated leached amount of mercury with the calculated initial amount in the mine waste comprising the reactor load. By the calculated material balance, the mercury extraction efficiency is at least 78 percent.

Example 5

To determine the role of copper sulfate pentahydrate as a catalyst promoter of mercury leaching from Virginia City mine waste (process tailings), leaching was performed in two steps. In the first step, the leach liquid was a water solution of sodium thiosulfate only. In the second step, copper sulfate pentahydrate was added to the stirred slurry mixture of water, tailings and sodium thiosulfate. For the first step, a weight of 210 grams of Virginia City process tailings was stirred with 1600 mL of water for 15 minutes to promote particle wetting. A sample of slurry was then filtered to obtain a baseline measure of the mercury content in the solid and in the water. To initiate the first leach step, 45 grams of sodium thiosulfate dissolved in 200 mL water was added to the slurry followed by stirring for one hour. A sample provided a measure of the mercury leached by the first step. One gram of copper sulfate pentahydrate catalyst was then added to initiate the second step, with stirring continued for an additional hour at an average temperature of 38° C. During contact with water only, the apparent efficiency of mercury extraction was only 0.34 percent, essentially a zero background value. First step leaching with sodium thiosulfate solution only provided a mercury extraction efficiency of 7.1 percent. Second step leaching following the addition of copper sulfate pentahydrate catalyst raised the mercury extraction efficiency to 75.5 percent. The ten-fold increase in mercury extraction produced by copper sulfate catalyst was verified by sampling the slurry and also by measuring the mercury content in the solid residue in the reactor after the second leach step. The residue sample was rinsed several times with deionized water, dried and then dissolved in aqua regia to provide a liquid for determination of mercury by inductively coupled plasma spectroscopy.

Example 6

As an example of extraction methods indicated generally in step 8, FIG. 1, leach liquid containing dissolved mercury was treated to remove said mercury in a de-ionizing polymer resin bead filled column. The purpose of resin bead extraction is to capture the mercury in a form which can be stored safely and which also may be further processed to recover the mercury in elemental form. After 10 minutes of preliminary soaking in deionized water, a 150 milliliter volume of commercially available ResinTech Type 200 beads was loaded into a glass column. A 500 milliliter volume of leachate from experiments with Virginia City NV mine waste, as described in Example 2, was slowly poured into the resin bead column, requiring 17 minutes to clear the column. The initial mercury content of the leachate sample was 37.2 milligram per liter (mg/L) as determined by ICP. The mercury content of the leachate after passing through the resin bead column was 11.6 mg/L, indicating a 69 percent mercury capture efficiency.

A process is described wherein rock powder suitable for agricultural fertilizer is obtained from mine waste and the like. The mine waste and the like are treated chemically to remove unwanted elements which might interfere unfavorably with plant nutrition. In one example, the chemical treatment is the leaching of elements from a stirred slurried mixture comprised of water, soluble non-toxic chemicals and finely divided mine waste and the like.

Mercury in mine waste that has been subjected to amalgamation processes can be leached by a leachate liquid including a water solution of sodium thiosulfate, preferably in the composition range from 1 to 50 grams per liter and more preferably in the range from 20 to 30 grams per liter together with copper sulfate pentahydrate preferably in the composition range from 0.1 to 10 grams per liter and more preferably in the composition range from 0.5 to 5 grams per liter. The temperature of the stirred slurried mixture is preferably maintained in the range from 15° C. to 80° C. and is more preferably maintained close to ambient temperature. At the completion of the leaching reaction, the leachate liquid can be separated from the solid residue, and the leachate liquid can be treated to extract metals or compounds by chemical, biochemical or electrochemical methods.

The process is desirably used with mine waste and the like comprised of particles preferably in the size range from 40 down to one or less micron and more preferably in the size range from 10 down to one or less micron. The solid treated mine waste residue can be used directly as rock powder, an agricultural fertilizer and soil supplement The solid residue can be mixed with organic matter to form an agricultural fertilizer. The combination of solid residue with organic matter can be accomplished in an anaerobic digester vessel. The organic matter can comprise food waste, produce waste, inedible plant leaves and stems and other green waste, animal manure and the like. The anaerobic digester can be heated to promote reaction, preferably in the temperature range from 20° C. to 80° C., more preferably in the range from 20° C. to 40° C.

The mixture of organic matter and treated mine waste can be supplemented by bacteria selected to promote digestion of the bio-waste including, but not limited to, *bacillus cereus* and *lactobacillus plantarum*.

Combustible gases evolved from reaction such as methane and hydrogen serve as fuel to a turbine or engine operated to generate electricity or may be burned to provide process heat.

The mixture can be separated by filtration and the like to yield biomineral fertilizer in both solid and liquid form.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for producing a soil additive using mine waste for agricultural use, comprising:
   treating the mine waste to selectively remove one or more elements; and
   combining the treated mine waste with organic material.

2. The method of claim 1, wherein said treating the mine waste includes leaching said one or more elements from the mine waste to produce the treated mine waste.

3. The method of claim 1, wherein said combining the treated mine waste with organic material includes using anaerobic digestion to produce a solid soil additive and a liquid soil additive.

4. The method of claim 1, wherein said treating the mine waste includes combining the mine waste with leach liquid in a stirred reactor, and separating the leach liquid from the remaining solid to provide the treated mine waste.

5. The method of claim 1, wherein said treating the mine waste includes leaching said one or more elements from the mine waste to produce the treated mine waste using a leachate fluid, and treating the leachate fluid after treating the mine waste to recover the one or more elements.

6. The method of claim 1, including dispersing the combination of the treated mine waste and organic material over an agricultural field.

7. A method for producing a soil additive using mine waste for agricultural use, comprising:
   treating the mine waste to selectively remove one or more elements; and
   combining the treated mine waste with organic material to provide a combination; and subjecting the combination to anaerobic digestion.

8. The method of claim 7, including capturing combustible gas byproducts of the anaerobic digestion.

9. The method of claim 7, including separating liquid from solid products of the anaerobic digestion to produce a solid soil additive and a liquid soil additive.

10. A method for producing a soil additive using mine waste for agricultural use, comprising:
    treating the mine waste to selectively remove one or more elements; and
    combining the treated mine waste with organic material, wherein said mine waste includes mercury byproduct of an amalgamation process, and the one or more elements is mercury.

11. A soil conditioning composition manufactured according to the method of claim 10.

12. A method for producing a soil additive using mine waste for agricultural use, comprising:
    treating the mine waste to selectively remove one or more elements; and
    combining the treated mine waste with organic material, wherein said one or more elements includes mercury, and said treating the mine waste includes leaching the mercury from the mine waste using a water solution of sodium thiosulfate and copper sulfate pentahydrate.

13. A method for producing a soil additive using mine waste for agricultural use, comprising:
    combining the mine waste with a leaching agent in a stirred reactor to remove one or more elements from the mine waste, and separating a leachate liquid from the remaining solid to provide treated mine waste; and
    combining organic material and the treated mine waste to provide a combination, and using anaerobic digestion of the combination to produce a soil additive.

14. The method of claim 13, including capturing combustible gas byproduct of the anaerobic digestion.

15. The method of claim 13, including separating liquid from solid products of the anaerobic digestion to produce a solid soil additive and a liquid soil additive.

16. The method of claim 13, wherein said mine waste includes mercury byproduct of an amalgamation process, and the one or more elements includes mercury.

17. The method of claim 13, wherein said mine waste includes mercury and the leachate liquid comprises a water solution of sodium thiosulfate and copper sulfate pentahydrate.

18. The method of claim 13, including treating the leachate liquid after treating the mine waste to recover a metal or compound including an element of the one or more elements.

* * * * *